United States Patent
Osawa

(10) Patent No.: US 7,847,050 B2
(45) Date of Patent: Dec. 7, 2010

(54) CROSSLINKABLE ORGANOPOLYSILOXANE COMPOSITIONS

(75) Inventor: Yoshihito Osawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 323 days.

(21) Appl. No.: 12/060,360

(22) Filed: Apr. 1, 2008

(65) Prior Publication Data

US 2008/0262149 A1    Oct. 23, 2008

(30) Foreign Application Priority Data

Apr. 20, 2007 (JP) ............... 2007-111155
Feb. 25, 2008 (JP) ............... 2008-042902

(51) Int. Cl.
*C08G 77/06* (2006.01)

(52) U.S. Cl. ..................... 528/28; 524/588

(58) Field of Classification Search ............ 528/28; 524/588
See application file for complete search history.

(56) References Cited

U.S. PATENT DOCUMENTS

| | | | |
|---|---|---|---|
| 2,989,559 A * | 6/1961 | Marsden ........... 556/436 |
| 3,390,162 A * | 6/1968 | Berger ............ 556/173 |
| 3,829,455 A * | 8/1974 | Wilkus et al. ...... 556/436 |
| 5,254,621 A | 10/1993 | Inoue et al. |
| 5,739,246 A * | 4/1998 | Graiver et al. ..... 528/32 |
| 6,121,404 A | 9/2000 | Liles |
| 2003/0060592 A1* | 3/2003 | Heeks et al. ...... 528/104 |
| 2006/0079605 A1 | 4/2006 | Sato et al. |
| 2007/0042124 A1 | 2/2007 | Matsumura et al. |

FOREIGN PATENT DOCUMENTS

| | | |
|---|---|---|
| DE | 10 2006 039 944 A1 | 2/2008 |
| JP | 52-22878 A | 2/1977 |
| JP | 5-98579 A | 4/1993 |
| JP | 8-151358 A | 6/1996 |
| JP | 8-245878 A | 9/1996 |
| JP | 8-283377 A | 10/1996 |
| JP | 9-235507 A | 9/1997 |
| JP | 10-298489 A | 11/1998 |
| JP | 2001-302966 A | 10/2001 |
| JP | 2005-325253 A | 11/2005 |
| JP | 2007-51236 A | 3/2007 |

\* cited by examiner

*Primary Examiner*—Margaret G Moore
(74) *Attorney, Agent, or Firm*—Birch Stewart Kolasch & Birch, LLP

(57) ABSTRACT

A crosslinkable organopolysiloxane composition comprising (A) a keto-containing organopolysiloxane and (B) a compound having at least two hydrazido and/or semicarbazido groups cures at room temperature into a film having safety and weathering resistance.

4 Claims, No Drawings

CROSSLINKABLE ORGANOPOLYSILOXANE COMPOSITIONS

CROSS-REFERENCE TO RELATED APPLICATION

This non-provisional application claims priority under 35 U.S.C. §119(a) on Patent Application Nos. 2007-111155 and 2008-042902 filed in Japan on Apr. 20, 2007 and Feb. 25, 2008, respectively, the entire contents of which are hereby incorporated by reference.

TECHNICAL FIELD

This invention relates to crosslinkable organopolysiloxane compositions which cure and crosslink in the absence of organometallic catalysts like organotin catalysts.

BACKGROUND ART

Organopolysiloxanes which cure and crosslink to form rubber or resin coatings are used as surface coating compositions on various substrates such as fabric, wood and rubber, binders for functional inorganic fillers such as photo-catalysts, and additives to coating compositions. Most of such curable silicone resins are compositions containing metal compounds such as tin catalysts as disclosed in JP-A 5-098579, JP-A 2005-325253, and JP-A 2007-051236. However, the metal compounds such as tin catalysts are problematic from the safety aspect.

As the silicone products which are crosslinked without a need for metal compounds such as tin catalysts, compositions comprising keto-containing compounds and hydrazido-containing compounds are known from JP-A 9-235507, JP-A 10-298489, and JP-A 2001-302966. The keto-containing compounds are available as block copolymers between organopolysiloxanes and keto-containing acrylic polymers. The inclusion of acrylic polymers is detrimental to weathering and other properties as compared with neat organopolysiloxane resin systems.

DISCLOSURE OF THE INVENTION

An object of the invention is to provide crosslinkable organopolysiloxane compositions which possess rubber elasticity while they are free of metal compounds like tin catalysts and also free of other resins like acrylic polymers.

The inventors have found that an organopolysiloxane composition comprising (A) a keto-containing organopolysiloxane having the compositional formula (1), defined below, and (B) a compound having at least two organic groups reactive with keto groups in the molecule is capable of curing into a product having safety and improved weathering because it does not contain metal compounds like tin catalysts or other resins like acrylic polymers.

The invention provides a crosslinkable organopolysiloxane composition comprising (A) a keto-containing organopolysiloxane having the compositional formula (1) and (B) a compound having at least two organic groups reactive with keto groups in the molecule.

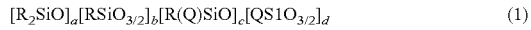
(1)

Herein R is a keto-free monovalent organic group of 1 to 20 carbon atoms, Q is a keto-containing monovalent organic group of 2 to 20 carbon atoms, the subscripts a, b, c and d are numbers in the range: $0 \leq a < 1$, $0 \leq b < 1$, $0 \leq c \leq 0.3$, $0 \leq d \leq 0.3$, $0 < c+d \leq 0.3$, $a+b+c+d=1$, and $(b+d)/(a+c) < 1$.

Typically, in component (B), the organic groups reactive with keto groups are hydrazido and/or semicarbazido groups.

One preferred embodiment is a crosslinkable organopolysiloxane composition in emulsified form obtained by dispersing and emulsifying a mixture in water in the presence of a surfactant, said mixture comprising (A) a keto-containing organopolysiloxane having the compositional formula (1), and (B) a compound having at least two hydrazido and/or semicarbazido groups in the molecule in such an amount that 0.1 to 2 moles of hydrazido and semicarbazido groups in total are present per mole of keto groups.

Another preferred embodiment is a crosslinkable organopolysiloxane composition in emulsified form obtained by dispersing and emulsifying a mixture in water in the presence of a surfactant, said mixture comprising (A) 100 parts by weight of a keto-containing organopolysiloxane having the compositional formula (1), (B) a compound having at least two hydrazido and/or semicarbazido groups in the molecule in such an amount that 0.1 to 2 moles of hydrazido and semicarbazido groups in total are present per mole of keto groups, and (C) 1 to 50 parts by weight of colloidal silica.

Preferably, Q in formula (1) is —$C_2H_4$—CHO, the reaction product of —$C_3H_6$—SH with diacetone acrylamide, the reaction product of —$C_3H_6$—$NH_2$ with diacetone acrylamide, or the reaction product of —$C_3H_6$—NH—$C_2H_4$—$NH_2$ with diacetone acrylamide.

BENEFITS OF THE INVENTION

The crosslinkable organopolysiloxane composition cures into a product having safety and improved weathering and other properties.

DESCRIPTION OF THE PREFERRED EMBODIMENT

The crosslinkable organopolysiloxane composition of the invention is defined as comprising (A) a keto-containing organopolysiloxane having the compositional formula (1) and (B) a compound having at least two organic groups reactive with keto groups, typically at least two hydrazido and/or semicarbazido groups, in the molecule.

In one preferred embodiment, the crosslinkable organopolysiloxane composition is a crosslinkable organopolysiloxane emulsion composition obtained by dispersing and emulsifying (A) a keto-containing organopolysiloxane having the compositional formula (1), (B) a compound having at least two hydrazido and/or semicarbazido groups in the molecule, and optionally, (C) colloidal silica in water in the presence of a surfactant.

First, component (A) is a keto-containing organopolysiloxane having the compositional formula (1):

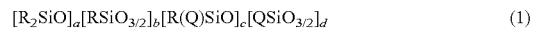
(1)

wherein R is a keto-free monovalent organic group of 1 to 20 carbon atoms, Q is a keto-containing monovalent organic group of 2 to 20 carbon atoms, the subscripts a, b, c and d are numbers in the range: $0 \leq a < 1$, $0 \leq b < 1$, $0 \leq c \leq 0.3$, $0 \leq d \leq 0.3$, $0 < c+d \leq 0.3$, $a+b+c+d=1$, and $(b+d)/(a+c) < 1$.

In formula (1), R is a keto-free monovalent organic group of 1 to 20 carbon atoms, preferably 1 to 12 carbon atoms. Examples include alkyl groups such as methyl, ethyl, propyl, butyl, pentyl, hexyl, heptyl, octyl, nonyl, decyl, dodecyl, tetradecyl, hexadecyl, octadecyl, cyclopentyl, cyclohexyl, and cycloheptyl; aryl groups such as phenyl, tolyl, and naphthyl; alkenyl groups such as vinyl and allyl; alkoxy groups such as methoxy, ethoxy, propoxy, butoxy, pentyloxy, hexyloxy, heptyloxy, and octyloxy; epoxy-containing organic groups such as 3-glycidoxypropyl and 2-(3,4-epoxycyclohexyl)ethyl; amino-containing organic groups such as 3-aminopropyl, N-(2-aminoethyl)-3-aminopropyl, N-(1,3-dimethylbutylidene)-3-aminopropyl, N-phenyl-3-aminopropyl; and mercapto-containing organic groups such as 3-mercaptopropyl. Preferably at least 30 mole % of R are methyl groups.

Q is a keto-containing monovalent organic group of 2 to 20 carbon atoms, examples of which include —$CH_2$—CHO, —$C_2H_4$—CHO, —$C_3H_6$—CHO, —$C_4H_8$—CHO, —$C_5H_{10}$—CHO, —$C_6H_{12}$—CHO, —$C_7H_{14}$—CHO, —$C_8H_{16}$—CHO, —$C_9H_{18}$—CHO, —$C_{10}H_{20}$—CHO, —$C_{11}H_{22}$—CHO, —$C_{12}H_{24}$—CHO, —$C_{13}H_{26}$—CHO, —$C_{14}H_{28}$—CHO, —$C_{15}H_{30}$—CHO, —$C_{16}H_{32}$—CHO, —$C_{17}H_{34}$—CHO, —$C_{18}H_{36}$—CHO, —$C_{19}H_{38}$—CHO, —$CH_2$—S—$C_2H_4$—CONH—C($CH_3$)$_2$—$CH_2COCH_3$, —$C_2H_4$—S—$C_2H_4$—CONH—C($CH_3$)$_2$—$CH_2COCH_3$, —$C_3H_6$—S—$C_2H_4$—CONH—C($CH_3$)$_2$—$CH_2COCH_3$, —$C_4H_8$—S—$C_2H_4$—CONH—C($CH_3$)$_2$—$CH_2COCH_3$, —$C_5H_{10}$—S—$C_2H_4$—CONH—C($CH_3$)$_2$—$CH_2COCH_3$, —$C_6H_{12}$—S—$C_2H_4$—CONH—C($CH_3$)$_2$—$CH_2COCH_3$, —$CH_2$—O—C($CH_3$)$_2$—$CH_2COCH_3$, —$C_2H_4$—O—C($CH_3$)$_2$—$CH_2COCH_3$, —$C_3H_6$—O—C($CH_3$)$_2$—$CH_2COCH_3$, —$C_4H_8$—O—C($CH_3$)$_2$—$CH_2COCH_3$, —$C_5H_{10}$—O—C($CH_3$)$_2$—$CH_2COCH_3$, —$C_6H_{12}$—O—C($CH_3$)$_2$—$CH_2COCH_3$, —$C_3H_6$—NH—$C_2H_4$—CONH—C($CH_3$)$_2$—$CH_2COCH_3$, —$C_3H_6$—N[—$C_2H_4$—CONH—C($CH_3$)$_2$—$CH_2COCH_3$]$_2$, —$C_3H_6$—NH—$C_2H_4$—NH—$C_2H_4$—CONH—C($CH_3$)$_2$—$CH_2COCH_3$, —$C_3H_6$—NH—$C_2H_4$—N[—$C_2H_4$—CONH—C($CH_3$)$_2$—$CH_2COCH_3$]$_2$, —$C_3H_6$—N[—$C_2H_4$—CONH—C($CH_3$)$_2$—$CH_2COCH_3$]—$C_2H_4$—$NH_2$, —$C_3H_6$—N[—$C_2H_4$—CONH—C($CH_3$)$_2$—$CH_2COCH_3$]—$C_2H_4$—NH—$C_2H_4$—CONH—C($CH_3$)$_2$—$CH_2COCH_3$, and —$C_3H_6$—N[—$C_2H_4$—CONH—C($CH_3$)$_2$—$CH_2COCH_3$]—$C_2H_4$—N[—$C_2H_4$—CONH—C($CH_3$)$_2$—$CH_2COCH_3$]$_2$.

Inter alia, preference is given to —$C_2H_4$—CHO, the reaction product of —$C_3H_6$—SH with diacetone acrylamide, the reaction product of —$C_3H_6$—$NH_2$ with diacetone acrylamide, and the reaction product of —$C_3H_6$—NH—$C_2H_4$—$NH_2$ with diacetone acrylamide, the reaction products being represented by —$C_3H_6$—S—$C_2H_4$—CONH—C($CH_3$)$_2$—$CH_2COCH_3$, —$C_3H_6$—N[—$C_2H_4$—CONH—C($CH_3$)$_2$—$CH_2COCH_3$]$_2$, and —$C_3H_6$—N[—$C_2H_4$—CONH—C($CH_3$)$_2$ —$CH_2COCH_3$]—$C_2H_4$—N[—$C_2H_4$—CONH—C($CH_3$)$_2$ —$CH_2COCH_3$]$_2$, respectively.

The subscripts a and b are numbers in the range: $0 \leq a < 1$ and $0 \leq b < 1$, and preferably $0 \leq a \leq 0.9999$ and $0 \leq b \leq 0.9999$. The subscripts c and d are numbers in the range: $0 \leq c \leq 0.3$, $0 \leq d \leq 0.3$, and $0 < c+d \leq 0.3$, and preferably $0 \leq c \leq 0.2$, $0 \leq d \leq 0.2$, and $0 < c+d \leq 0.2$. If $c+d > 0.3$, then the crosslinked product becomes brittle. The sum of a+b+c+d is equal to 1. It is noted that the meaning of a+b+c+d=1 is that in a polymer comprising recurring units a, b, c, and d, the sum of recurring units a, b, c, and d is 100 mol % based on the total amount of entire recurring units. The value of (b+d)/(a+c) is less than 1. If (b+d)/(a+c) is greater than 1, then the coating becomes too hard. It is preferred that the value of (b+d)/(a+c) be equal to or less than 0.25, and more preferably equal to or less than 0.1. The sum of b+d may be equal to 0 although (b+d)/(a+c) should preferably be equal to or more than 0.0001.

The keto-containing organopolysiloxane may be prepared by many methods, for example, the reaction of diacetone acrylamide with a mercapto-containing organopolysiloxane through Michael addition; the reaction of diacetone acrylamide with a mercapto- or amino-containing alkoxysilane through Michael addition to form a keto-containing alkoxysilane and subsequent polymerization thereof together with an organosiloxane oligomer and alkoxysilane in a well-known manner; and the reaction of acrolein diacetal with a hydrogen-containing alkoxysilane, removal of alcohol in a dilute hydrochloric acid/alcohol solution to form a keto-containing alkoxysilane, and subsequent polymerization thereof together with an organosiloxane oligomer and alkoxysilane in a well-known manner. In these methods, the type and amount of reactants are preferably selected so that the polymer may contain more D units than T units.

Preferably the keto-containing organopolysiloxane is used in emulsion form. It may be emulsified using any desired surfactant. Examples of suitable surfactants include nonionic surfactants such as polyoxyethylene alkyl ethers, polyoxyethylene propylene alkyl ethers, polyoxyethylene alkyl phenyl ethers, and polyoxyethylene fatty acid esters; anionic surfactants such as alkylsulfates, alkylbenzenesulfonates, alkylsulfosuccinates, alkylphosphates, polyoxyethylene alkyl ether hydrogen sulfate salts, and polyoxyethylene alkyl phenyl ether hydrogen sulfate salts; cationic surfactants such as quaternary ammonium salts and alkylamine acetate salts; and ampholytic surfactants such as alkylbetaines and alkylimidazolines. Among others, the nonionic surfactants such as polyoxyethylene alkyl ethers, polyoxyethylene propylene alkyl ethers, and polyoxyethylene alkyl phenyl ethers, and the anionic surfactants such as alkylsulfates and alkylbenzenesulfonates are preferred for stability.

Specific examples of the foregoing emulsifiers include polyoxyethylene octyl ether, polyoxyethylene nonyl ether, polyoxyethylene decyl ether, polyoxyethylene propylene decyl ether, polyoxyethylene lauryl ether, polyoxyethylene propylene lauryl ether, polyoxyethylene tridecyl ether, polyoxyethylene propylene tridecyl ether, polyoxyethylene myristyl ether, polyoxyethylene cetyl ether, polyoxyethylene stearyl ether, polyoxyethylene octyl phenyl ether, polyoxyethylene nonyl phenyl ether, polyoxyethylene styrenic phenyl ether, polyoxyethylene sodium alkylsulfates, polyoxyethylene sodium alkylphenylsulfates, ammonium lauryl sulfate, triethanolamine lauryl sulfate, sodium dodecylbenzenesulfonate, ammonium dodecylbenzenesulfonate, and triethanolamine dodecylbenzenesulfonate. These emulsifiers may be used alone or in admixture.

The surfactant is preferably added in an amount of 0.1 to 50 parts, more preferably 0.5 to 30 parts, and even more preferably 1 to 20 parts by weight per 100 parts by weight of the keto-containing organopolysiloxane. Less than 0.1 pbw of the surfactant may not allow for effective emulsification. If more than 50 pbw of the surfactant is used, there may result a crosslinked coating having a low hardness or strength.

The amount of water used is not particularly limited. Preferably water is used in such amounts that the active ingredient, keto-containing organopolysiloxane is in a concentration of 0.1 to 80% by weight, and more preferably 0.5 to 60% by weight.

Component (B) is a compound having in the molecule at least two organic groups which are reactive with keto groups. It serves as a crosslinker for the organopolysiloxane through reaction with keto groups. Preferred are compounds having at least two hydrazido and/or semicarbazido groups in the molecule, that is, compounds having at least two groups selected from hydrazido groups of the formula —CO—NH—$NH_2$ and semicarbazido groups of the formula —NH—CO—NH—$NH_2$ in the molecule.

Exemplary compounds include compounds of the formula $H_2N$—NH—CO—$(CH_2)_n$—CO—NH—$NH_2$ wherein n is 0 to 8, and preferably 1 to 6, saturated aliphatic carboxylic acid dihydrazides of 2 to 18 carbon atoms such as oxalic acid dihydrazide, malonic acid dihydrazide, glutaric acid dihydrazide, succinic acid dihydrazide, adipic acid dihydrazide, and sebacic acid dihydrazide; monoolefinic unsaturated dicarboxylic acid dihydrazides such as maleic acid dihydrazide, fumaric acid dihydrazide, and itaconic acid dihydrazide; phthalic acid, terephthalic acid, and isophthalic acid dihydrazides; pyromellitic acid dihydrazide, trihydrazide, and tetrahydrazide; nitrilotrihydrazide, citric acid trihydrazide, 1,2,4-benzenetrihydrazide, ethylenediamine tetraacetic acid tetrahydrazide, 1,4,5,8-naphthoic acid tetrahydrazide, polyhydrazide obtained through reaction of a low polymer having lower alkyl carboxylate groups with hydrazine or hydrazine hydrate (see JP-B 52-22878); carbonic acid dihydrazide, bissemicarbazide; polyfunctional semicarbazides obtained through reaction of diisocyanates such as hexamethylene diisocyanate and isophorone diisocyanate and polyisocyanate compounds derived therefrom with an excess of N,N-substituted hydrazines such as N,N-dimethylhydrazine or hydrazides as exemplified above, aqueous polyfunctional semicarbazides obtained through reaction of isocyanate groups in the reaction products of the foregoing polyisocyanate compounds with active hydrogenated compounds having a hydrophilic group such as polyether polyols or polyethylene glycol monoalkyl ethers, with an excess of hydrazides as exemplified above, and mixtures of the polyfunctional semicarbazides and the aqueous polyfunctional semicarbazides (see JP-A 8-151358, JP-A 8-245878, and JP-A 8-283377).

Component (B), typically the compound having at least two hydrazido and/or semicarbazido groups is desirably added in such an amount that 0.1 to 2 moles of organic groups reactive with keto groups (typically hydrazido and semicarbazido groups) are present per mole of keto groups. Outside the range, the crosslinking effect becomes insufficient. The preferred amount of organic groups reactive with keto groups is 0.2 to 1.6 moles, and more preferably 0.4 to 1.2 moles per mole of keto groups.

To the crosslinkable organopolysiloxane composition, (C) colloidal silica may be added for improving the dry rubber strength. The colloidal silica which can be used herein is commercially available and its type is not particularly limited. For example, those colloidal silicas stabilized with sodium, ammonium or aluminum and having a particle size of 5 to 50 nm are useful. Commercial examples include Snowtex® (Nissan Chemical Industries, Ltd.), Ludox® (Grace), Silicadol® (Nippon Chemical Industrial Co., Ltd.), Adelite® AT (Adeka Corp.), and Cataloid® S (Catalysts and Chemicals Industries Co., Ltd.).

Preferably colloidal silica is added in an amount of 1 to 50 parts, and more preferably 3 to 30 parts by weight per 100 parts by weight of the keto-containing organopolysiloxane. Less than 1 pbw of colloidal silica may be too small to enhance rubber strength whereas more than 50 pbw of colloidal silica may lead to a silicone coating which is hard and brittle.

Various additives may be added to the composition as long as they do not prevent the composition from crosslinking. Suitable additives are water-soluble polymeric thickeners such as carboxymethyl cellulose, polyvinyl alcohol and sodium polyacrylate, inorganic fillers and colorants such as titanium oxide and zinc oxide, preservatives, anti-corrosive agents, and wetters. The composition may be applied as a surface coating agent to fibers, fabric, wood, metals, rubber and cement, a binder for functional inorganic fillers such as photo-catalysts, a coating composition, and the like.

The amount of water used is not particularly limited. Preferably water is used in such amounts that the crosslinkable organopolysiloxane composition contains 0.1 to 80%, and more preferably 0.5 to 60% by weight of the active ingredients.

EXAMPLE

Examples of the invention are given below by way of illustration and not by way of limitation.

Preparation Example 1

A 1-liter separable flask equipped with a stirrer and condenser was charged with 392 g of 3-mercaptopropyltrimethoxysilane and 169 g of diacetone acrylamide, whereupon reaction took place at 125° C. for 12 hours. Then the flask was heated at 155° C. under 5 mmHg for vacuum stripping, yielding 347 g of a keto-containing silane K as a pale yellow clear fluid. On analysis by gas chromatography and NMR, it was found to have a purity of 98% and the following structure.

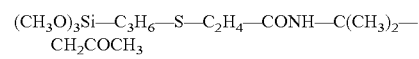

Preparation Example 2

A 2-liter polyethylene beaker was charged with 498 g of dimethylcyclosiloxane, 2 g of triethoxyphenylsilane, 50 g of a 10 wt % sodium lauryl sulfate aqueous solution, and 50 g of a 10 wt % dodecylbenzenesulfonic acid aqueous solution, which were uniformly emulsified by means of a homomixer. Then 400 g of water was gradually added thereto for dilution. This was passed twice through a high-pressure homogenizer under a pressure of 30 MPa, yielding a uniform white emulsion. The emulsion was transferred to a 2-liter glass flask equipped with a stirrer, thermometer and reflux condenser where polymerization reaction took place at 50° C. for 40 hours and then at 15° C. for 12 hours. The polymerized emulsion was combined with 33 g of a 15 wt % sodium lauryl sulfate aqueous solution and 7.5 g of keto-containing silane K, prepared in Preparation Example 1, and agitated by a homomixer until uniform. Then polymerization reaction took place at 15° C. for 3 hours. It was neutralized to pH 8.5 with 11 g of 10 wt % aqueous ammonia, yielding an emulsion of keto-containing organopolysiloxane. The emulsion had a nonvolatile content of 44.3 wt % on drying at 105° C. for 3 hours. The organopolysiloxane in the emulsion was a soft gel having no fluidity and had the composition shown below. In this way, an emulsion A-1 containing 42.8 wt % of keto-containing organopolysiloxane was obtained.

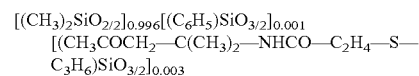

Preparation Example 3

An emulsion of keto-containing organopolysiloxane was prepared as in Preparation Example 2 except that 2.5 g of keto-containing silane K was used. The emulsion had a nonvolatile content of 44.3 wt % on drying at 105° C. for 3 hours.

The organopolysiloxane in the emulsion was a soft gel having no fluidity and had the composition shown below. In this way, an emulsion A-2 containing 42.8 wt % of keto-containing organopolysiloxane was obtained.

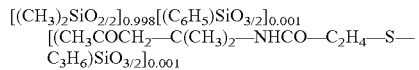

[(CH$_3$)$_2$SiO$_{2/2}$]$_{0.998}$[(C$_6$H$_5$)SiO$_{3/2}$]$_{0.001}$
[(CH$_3$COCH$_2$—C(CH$_3$)$_2$—NHCO—C$_2$H$_4$—S—C$_3$H$_6$)SiO$_{3/2}$]$_{0.001}$

Preparation Example 4

An emulsion of keto-containing organopolysiloxane was prepared as in Preparation Example 2 except that 12.6 g of keto-containing silane K was used. The emulsion had a non-volatile content of 44.4 wt % on drying at 105° C. for 3 hours. The organopolysiloxane in the emulsion was a soft gel having no fluidity and had the composition shown below. In this way, an emulsion A-3 containing 42.9 wt % of keto-containing organopolysiloxane was obtained.

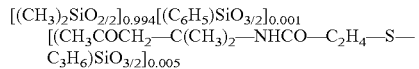

[(CH$_3$)$_2$SiO$_{2/2}$]$_{0.994}$[(C$_6$H$_5$)SiO$_{3/2}$]$_{0.001}$
[(CH$_3$COCH$_2$—C(CH$_3$)$_2$—NHCO—C$_2$H$_4$—S—C$_3$H$_6$)SiO$_{3/2}$]$_{0.005}$

Examples 1 to 6 and Comparative Examples 1 to 3

Crosslinkable organopolysiloxane emulsion compositions were prepared by compounding each of keto-containing organopolysiloxane emulsions A-1, A-2 and A-3 with a 5 wt % aqueous solution of adipic acid dihydrazide B-1 as a hydrazide compound and Snowtex C (Nissan Chemical Industries, Ltd., active ingredient 20 wt %) C-1 as colloidal silica in accordance with the recipe shown in Table 1. Each emulsion composition was placed in a tray in such an amount as to provide a dry thickness of 0.7 mm. It was dried at room temperature for 48 hours. The dry residue was examined for outer appearance by hand touch. If the dry residue was a rubber sheet, it was tested for tensile strength and elongation according to JIS K6249. The results are shown in Table 1.

TABLE 1

| | | | Example | | | | | | Comparative Example | | |
|---|---|---|---|---|---|---|---|---|---|---|---|
| | | | 1 | 2 | 3 | 4 | 5 | 6 | 1 | 2 | 3 |
| Formulation (net content in pbw) | Component A | A-1 | 100 | 100 | 100 | — | — | 100 | 100 | — | — |
| | | A-2 | — | — | — | 100 | — | — | — | 100 | — |
| | | A-3 | — | — | — | — | 100 | — | — | — | 100 |
| | Component B | B-1 | 0.39 | 0.39 | 0.39 | 0.13 | 0.65 | 0.39 | — | — | — |
| | Component C | C-1 | 10 | 5 | 15 | 10 | 10 | — | 10 | 10 | 10 |
| Keto/hydrazido molar ratio | | | 1/1 | 1/1 | 1/1 | 1/1 | 1/1 | 1/1 | 1/0 | 1/0 | 1/0 |
| Dry residue | Appearance | | film | film | film | film | film | film | gel | gel | gel |
| | Tensile strength (MPa) | | 1.3 | 1.3 | 1.5 | 0.9 | 1.6 | 0.3 | UM | UM | UM |
| | Elongation (%) | | 390 | 440 | 390 | 750 | 320 | 1020 | | | |

* UM: unmeasurable

Example 7 and Comparative Example 4

The emulsion compositions of Example 1 and Comparative Example 1 were diluted with water to 4 wt % of the active ingredients, brush coated onto a surface of solid cedar wood to a buildup of 200 g/m², and air dried for 48 hours. The treated wood was visually examined for water repellency and rated "OK" when repellent and "NG" when not repellent (water penetrated). It was subjected to a weathering test using a weatherometer, following which it was visually examined for water repellency again. The results are shown in Table 2.

TABLE 2

| | | | Example 7 | Comparative Example 4 |
|---|---|---|---|---|
| Formulation (net content in pbw) | Component A | A-1 | 100 | 100 |
| | Component B | B-1 | 0.39 | — |
| | Component C | C-1 | 10 | 10 |
| Keto/hydrazido molar ratio | | | 1/1 | 1/0 |
| Water repellency of treated wood | Initial | | OK | OK |
| | After weathering test | | OK | NG |

The weatherometer used was Super UV tester W-11 by Iwasaki Electric Co., Ltd. The weathering conditions include 100 cycles consisting of 4 hours irradiation and 4 hours dew condensation, UV illuminance 100 mW/cm², black panel temperature 70° C. during irradiation, humidity 50% during irradiation, and showering 15 seconds before and after irradiation.

It is seen from Tables 1 and 2 that a composition comprising a keto-containing organopolysiloxane and adipic acid dihydrazide turns into a film as crosslinking reaction proceeds, the inclusion of colloidal silica enhances the rubber strength of a film, and the composition forms a durable film with water repellency when coated onto wood surface.

Japanese Patent Application Nos. 2007-111155 and 2008-042902 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A crosslinkable organopolysiloxane composition comprising
   (A) a keto-containing organopolysiloxane having the compositional formula (1):

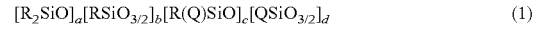

$$[R_2SiO]_a[RSiO_{3/2}]_b[R(Q)SiO]_c[QSiO_{3/2}]_d \quad (1)$$

wherein R is a keto-free monovalent organic group of 1 to 20 carbon atoms, Q is a keto-containing monovalent organic group of 2 to 20 carbon atoms, the subscripts a, b, c and d are numbers in the range: $0 \leq a < 1$, $0 \leq b < 1$, $0 \leq c \leq 0.3$, $0 \leq d \leq 0.3$, $0 < c+d \leq 0.3$, $a+b+c+d=1$, and $(b+d)/(a+c)<1$, and
   (B) a compound having at least two hydrazido and/or semi-carbazido groups reactive with keto groups in the molecule.

2. A crosslinkable organopolysiloxane composition in emulsified form obtained by dispersing and emulsifying a mixture in water in the presence of a surfactant, said mixture comprising (A) a keto-containing organopolysiloxane having the compositional formula (1):

$$[R_2SiO]_a[RSiO_{3/2}]_b[R(Q)SiO]_c[OSiO_{3/2}]_d \tag{1}$$

wherein R is a keto-free monovalent organic group of 1 to 20 carbon atoms, Q is a keto-containing monovalent organic group of 2 to 20 carbon atoms, the subscripts a, b, c and d are numbers in the range: $0 \leq a < 1$, $0 \leq b < 1$, $0 \leq c \leq 0.3$, $0 \leq d \leq 0.3$, $0 < c+d \leq 0.3$, $a+b+c+d=1$, and $(b+d)/(a+c) < 1$, and (B) a compound having at least two hydrazido and/or semicarbazido groups in the molecule in such an amount that 0.1 to 2 moles of hydrazido and semicarbazido groups in total are present per mole of keto groups.

3. A crosslinkable organopolysiloxane composition in emulsified form obtained by dispersing and emulsifying a mixture in water in the presence of a surfactant, said mixture comprising (A) 100 parts by weight of a keto-containing organopolysiloxane having the compositional formula (1):

$$[R_2SiO]_a[RSiO_{3/2}]_b[R(Q)SiO]_c[QSiO_{3/2}]_d \tag{1}$$

wherein R is a keto-free monovalent organic group of 1 to 20 carbon atoms, Q is a keto-containing monovalent organic group of 2 to 20 carbon atoms, the subscripts a, b, c and d are numbers in the range: $0 \leq a < 1$, $0 \leq b < 1$, $0 \leq c \leq 0.3$, $0 \leq d \leq 0.3$, $0 < c+d \leq 0.3$, $a+b+c+d=1$, and $(b+d)/(a+c) < 1$, (B) a compound having at least two hydrazido and/or semicarbazido groups in the molecule in such an amount that 0.1 to 2 moles of hydrazido and semicarbazido groups in total are present per mole of keto groups, and (C) 1 to 50 parts by weight of colloidal silica.

4. The composition of any one of claims 1, 2 and 3 wherein Q in formula (1) is —$C_2H_4$—CHO, the reaction product of —$C_3H_6$—SH with diacetone acrylamide, the reaction product of —$C_3H_6$—$NH_2$ with diacetone acrylamide, or the reaction product of —$C_3H_6$—NH—$C_2H_4$—$NH_2$ with diacetone acrylamide.

* * * * *